United States Patent [19]

Lamic et al.

[11] 4,198,896

[45] Apr. 22, 1980

[54] SELF-PROPELLED ENGINE WITH SEPARABLE STAGES

[75] Inventors: Jackie G. Lamic, Saint Medard en Jalles; Pierre B. Pascal, Lesigny; Michel E. Schilling, Epinay sur Seine, all of France; Hubert A. Zante, Teheran, Iran

[73] Assignees: Societe Nationale des Poudres et Explosifs; Societe Luchaire, both of Paris, France

[21] Appl. No.: 865,025

[22] Filed: Dec. 28, 1977

[30] Foreign Application Priority Data

Dec. 28, 1976 [FR] France .................... 76 39280

[51] Int. Cl.² ............................................. F41F 3/04
[52] U.S. Cl. .................................. 89/1.818; 102/49.4
[58] Field of Search ............... 102/49.4; 89/1.818; 60/224, 225

[56] References Cited

U.S. PATENT DOCUMENTS

| 3,491,692 | 1/1970 | Blankenagel | 102/49.4 |
| 4,023,496 | 5/1977 | Fink | 102/49.4 |
| 4,050,351 | 9/1977 | Stauff | 89/1.818 |

*Primary Examiner*—Verlin R. Pendegrass
*Attorney, Agent, or Firm*—Bucknam and Archer

[57] ABSTRACT

A self-propelled engine, such as a rocket, is described which is intended to be launched from a tube, comprising a front stage and a rear accelerating stage, means for achieving the separation of the two stages at the end of the combustion of the propellant charge contained in the acceleration stage, said propellant charge being integral with the front wall of the rear acceleration stage, wherein the front wall includes a first fixed part and a second part capable of sliding along the axis of the engine, said front wall parts each carrying respective propellant charges separated by a partition fixed in leakproof manner to one of said parts of the front wall. The second part which slides rests against the front stage, and the charge carried by the second part has a slightly longer combustion time than that carried by the first part which is fixed.

13 Claims, 7 Drawing Figures

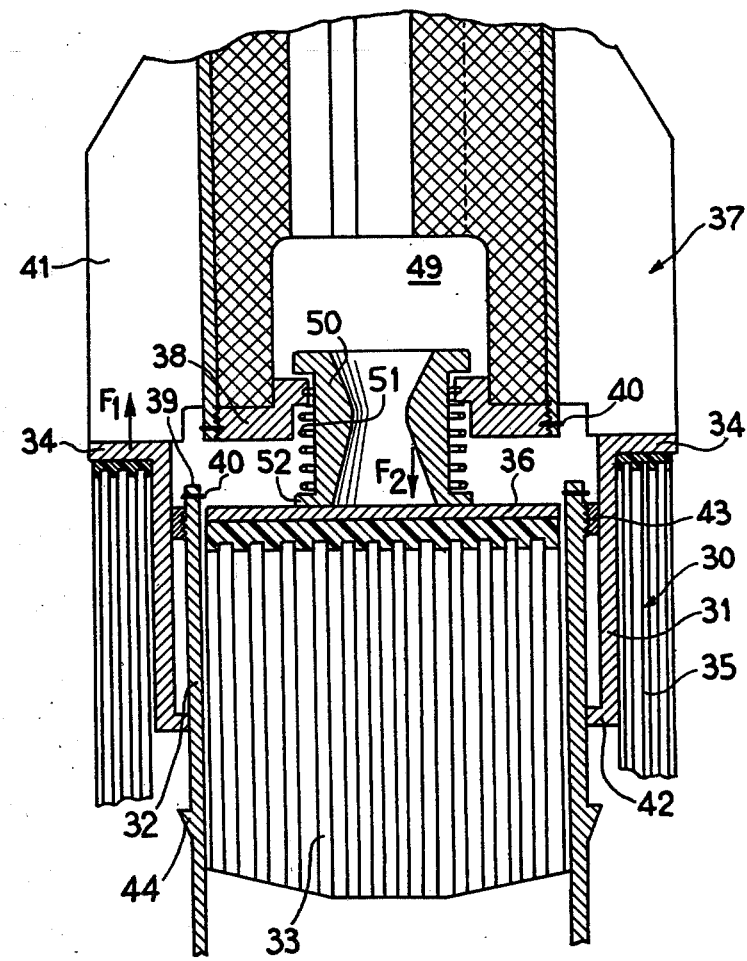

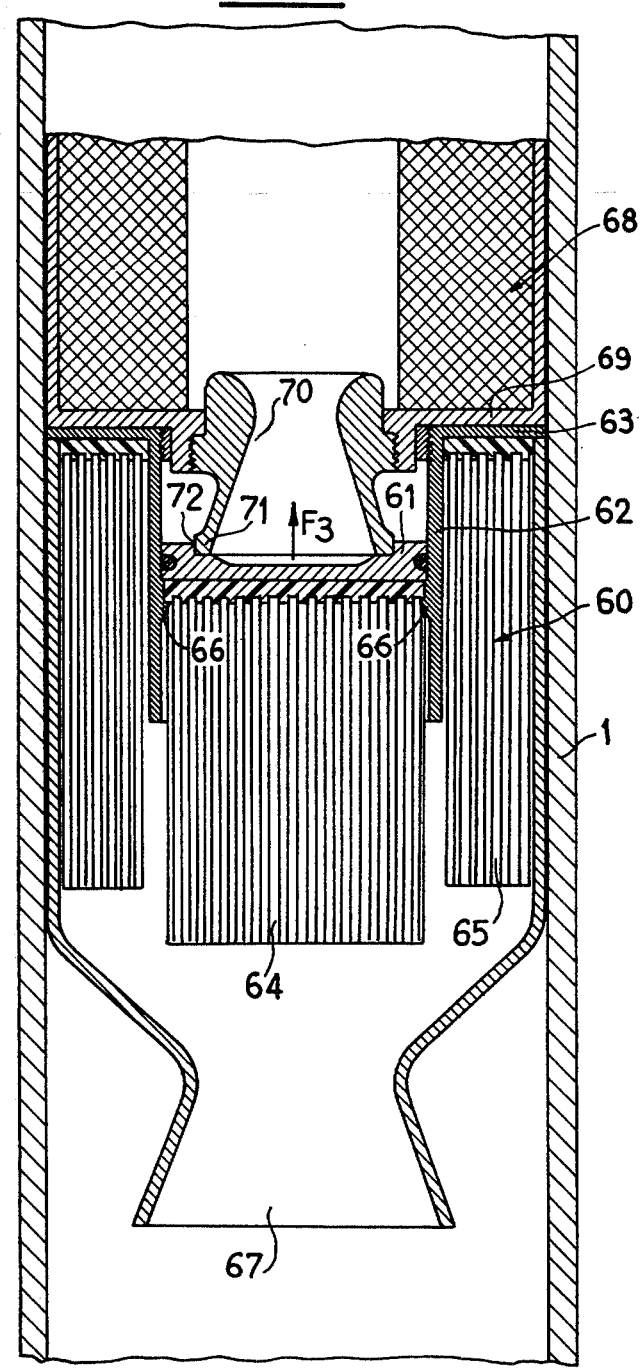

SELF-PROPELLED ENGINE WITH SEPARABLE STAGES

The present invention relates to a self-propelled engine with separable stages, such as a rocket intended to be launched by means of a launching tube.

The invention relates to a self-propelled engine comprising a rear accelerating stage, a front cruising stage, and means for separating the two stages when the combustion of the charge contained in the accelerating stage has ended.

Different means for separating two stages of a self-propelled engine have been proposed.

The use of at least one special propellant charge which either solely breaks a temporary connection between the two stages, is described in French Pat. No. 1,435,514, or the use of such a charge causes the break of such temporary connection and causes actual separation of the two stages, as described in French Pat. No. 2,260,078.

Alternatively it has been proposed to achieve stage separation using the combustion gases of the propellant charge contained in the rear stage, it being possible for the separation means to be either inside the rear stage, as described in French Pat. No. 1,328,459, or outside the latter, as described in French Pat. No. 1,549,618.

The known means of separation have the major disadvantage of being complex, and they tend to function in a manner which is not perfectly reproducible.

The present invention aims at overcoming this disadvantage and accordingly provides a self-propelled engine of simplified construction in which the separation of the two stages occurs under very favorable conditions of reproducible, effectiveness and safety.

The self-propelled engine according to the invention comprises a rear acceleration stage and a front stage and means for achieving the separation of the two stages shortly before the end of combustion of the propellant charge contained in the acceleration stage, this propellant charge being integral with the front wall of the rear acceleration stage.

In accordance with the invention, the self-propelled engine comprises a front wall which has a fixed part and a part which may slide along the axis of the engine. Both the fixed part and the part which moves carry a propellant charge, the respective propellant charges being separated by a partition fixed in leakproof manner to one of said parts of the front wall; the second part which slides rests against the front stage, and carries a propellant charge having a slightly longer combustion time than that of the charge carried by the part of the front wall which is fixed.

When the combustion of the propellant charge carried by the fixed first part of the rear stage front wall has ended, only the second part of the latter which slides is subjected to the thrust of the combustion gases. As a result, the second part moves relative to the first part in the direction towards the front stage, and pushes the front stage so as to separate it from the rear stage. Due to the partition separating the two propellant charges, the combustion gases formed by one of the charges come into only partial contact with the combustion chamber of the other charge, with the result that both parts of the front wall, both the fixed part and the sliding part are principally subjected to the thrust of the combustion gases formed in the respective combustion chambers. The inertia of the first part assists the relative movement of the two parts of the front wall.

Thus the two stages are separated in an engine according to the invention, in a simple and efficient manner, without it being necessary to use additional propellant charges or complex devices, the essential point being that the charge carried by the second part of the front wall which slides possesses a combustion time which is slightly greater than that of the other charge. Since these combustion times are not generally greater than a dozen or a few dozen milliseconds, the difference between these times can be as little as one or a few milliseconds.

The second part of the front wall which slides is preferably guided axially by the partition which separates the two propellant charges.

In one preferred embodiment of the invention, the second part of the front wall which slides is firmly connected to the other part by a temporary connection which can be broken by the action of the thrust of the combustion gases of the charge carried by the second part which slides when the combustion of the other charge has ended.

This arrangement makes it possible for the two stages to be separated at an instant of time which can be determined with great precision.

Some embodiments of the invention will now be described in greater detail by way of example with reference to the accompanying drawings, in which:

FIG. 5 is a similar view to FIG. 4, showing the separation of the two stages; and FIG. 6 is a partial longitudinal cross-section through a further rocket in accordance with the invention.

Figure 1:
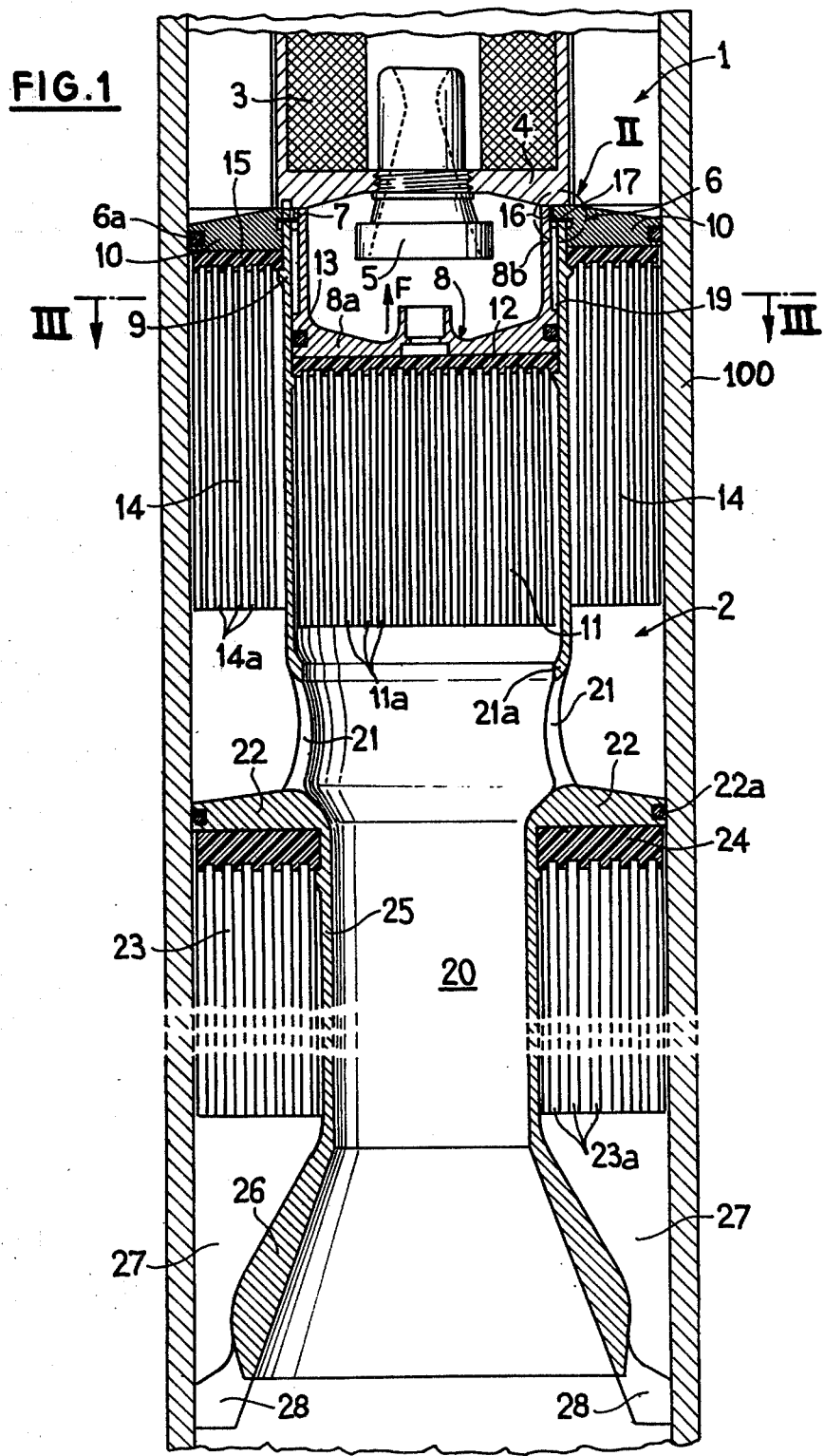
FIG. 1 is a partial longitudinal cross-section through a rocket embodying the invention inserted in a launching tube.

In FIG. 1, the rocket inserted in the launching tube 100 comprises a front cruising stage 1 and a rear accelerating stage 2. The front stage 1 contains a pyrotechnic charge 3 and comprises a base 4 carrying a nozzle 5. The base 4 of the front stage 1 is detachably fixed and is centred on a front wall 6 of the rear stage 2. The detachable fixing is provided by a series of pins 7 distributed around the periphery of the base 4 and inserted in holes in the front wall 6 of the rear stage 2. The front wall 6 is fitted with an annular gasket 6a which provides a seal with the tube 100.

The diameter of the front stage 1 is less than the diameter of the front wall 6 of the rear stage 2, which comprises a part 8 which can slide along the longitudinal axis of the rocket towards the front stage 1. The part 8 is in the form of a piston mounted in a casing 9 which is firmly fixed to an annular peripheral part 10 of the front wall 6. The head 8a of the piston 8 carries a propellant charge 11 comprising tubes of propellant 11a, the ends of which are embedded in a base-plate 12 made of plastics material. Furthermore, the head 8a of the piston 8 is surrounded by an O-ring 13 which provides a seal between the piston 8 and the casing 9.

The casing 9 is surrounded by a second propellant charge 14, having comparable characteristics to those of the charge 11, which comprises tubes of propellant 14, the ends of which are embedded in a baseplate 15 abutting against the annular peripheral part 10 of the front wall 6.

The two propellant charges 11 and 14 are coaxial and are separated from each other by a partition consisting of the casing 9 which is connected in sealed manner to the annular peripheral part 10. The central pyrotechnic charge 11 possesses a combustion time which is slightly greater than the combustion time of the peripheral charge 14.

The propellant charge 11 possesses, for example, a combustion time of 8 milliseconds, and the charge 14 possesses a combustion time of 7 milliseconds. The propellant used is, for example, of the solventless two-component type. The suitable difference in the combustion times can be found varying the thickness of the propellant in the tubes 11a and 14a.

Figure 2:
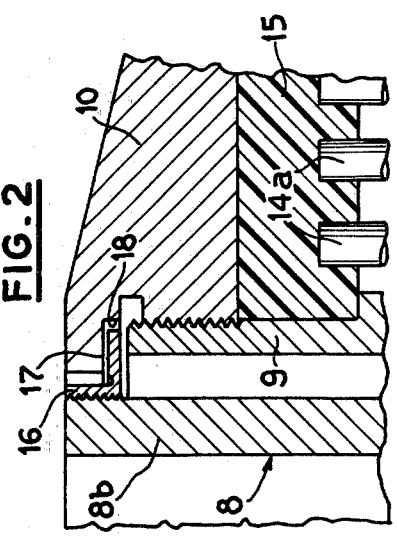
FIG. 2 is a detailed view on a larger scale of the part II of the rocket shown in FIG. 1.
Figure 3:
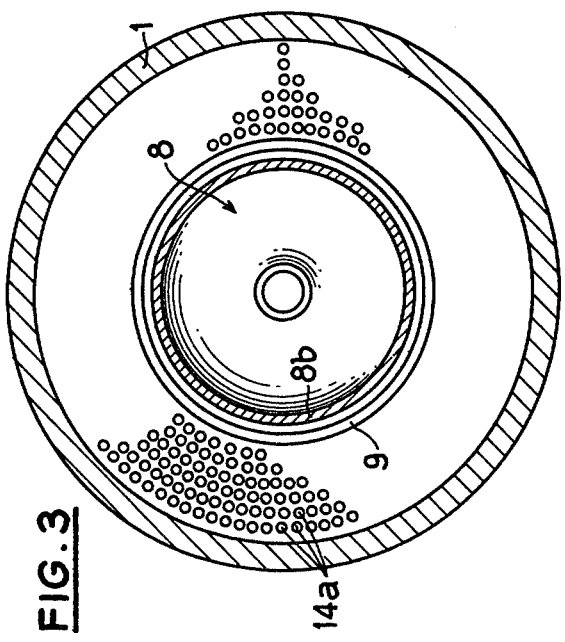
FIG. 3 is a cross-section taken along the line III—III in FIG. 1.
Figure 7:
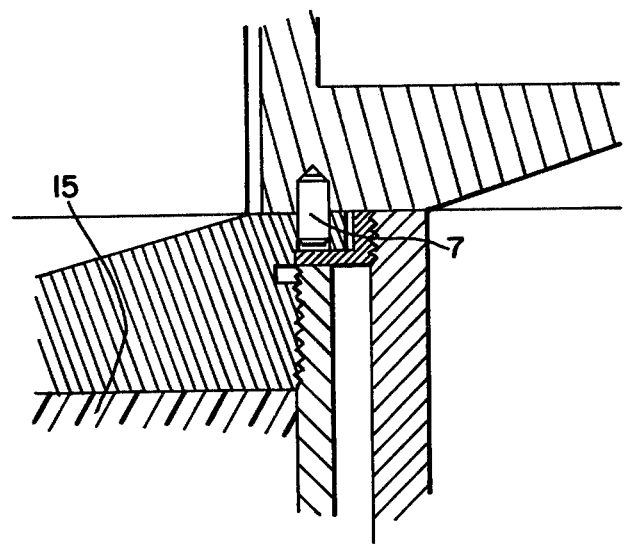
FIG. 7 is a portion of FIG. 1 on an enlarged scale showing the pins.

The piston 8 rests freely against the base 4 of the front stage 1 by means of its skirt 8b. The end of the skirt 8b of the piston 8 is firmly fixed to the fixed annular part 10 of the front wall 6 by means of a frangible joint which consists of a flanged washer equipped with tabs 16 (see, in particular, FIG. 2) which, on the one hand, are fixed to the end of the skirt 8b of the piston 8 and, on the other hand, are inserted under a shoulder 17 projecting over the internal surface 18 of the annular part 10 of the front wall 6. The tabs 16 can be sheared by the action of the thrust of the combustion gases of the internal charge 11, as will become apparent from the following description.

The movement of the piston 8 in the casing 9 is restricted by stops consisting, on the one hand, of a shoulder 19 of the head 8a of the piston 8 and, on the other hand, of the shoulder 17 projecting over the internal surface 18 of the fixed annular part 10.

The casing 9 possesses, behind the propellant charges 11 and 14 and in front of the nozzle 20, connecting apertures 21 which ensure the ejection, through the above mentioned nozzle 20, of all the combustion gases formed by the two charges 11 and 14. The periphery of the connecting apertures 21 assumes a curved profile which is suitable for preventing any disturbances occurring when the combustion gases pass through these apertures 21, and the casing 9 comprises a conical throat 21a which forms part of this curved profile.

The rear stage 2 comprises, immediately behind the connecting apertures 21 and substantially around the inlet of the central nozzle 20, an intermediate wall 22 carrying a third propellant charge 23 which comprises tubes of propellant 23a embedded in a base-plate 24 made of plastics material. The propellant charge 23 therefore surrounds a cylindrical body 25 of the nozzle 20. Like the front wall 6, this intermediate wall 22 is fitted with a gasket 22a which provides a seal with the tube 100. The outlet of the nozzle 20 is divergent, its external surface 26 forming, together with the internal surface of the launching tube 100, a peripheral annular nozzle 27 for the ejection of the combustion gases from the propellant charge 23. The rear of the nozzle 20 carries small blades 28 for rotating the rocket.

Upon simultaneous ignition of the propellant charges 11, 14 and 23, the thrust created by the combustion gases emitted by these charges propels the rocket out of the tube 100. Throughout the entire duration of the combustion of the two charges 11 and 14, the head 8a of the piston 8, and the fixed annular part 10 of the front wall 6, are subjected to similar pressures, and the piston 8 is held against movement relative to the annular part 10 of the front wall 6. The annular part 10 remains in contact with the base 4 of the front stage 1, as does the end of the skirt 8b of the piston 8, because each propellant charge develops a thrust which is greater than the inertia forces experienced by the part of the front wall which is firmly fixed to this charge.

After a combustion time of 7 milliseconds, the pressure of the combustion gases emitted by the peripheral charge 14 drops abruptly, with the result that the thrust pushing against the annular part 10 of the wall 6 becomes zero. For one millisecond, the piston 8 is still subjected to the thrust exerted by the combustion gases formed by the central charge 11 and the piston 8 therefore moves forwards in the direction of arrow F in FIG. 1, shearing the tabs 16.

The movement of the piston 8 pushes the front stage 1, whilst separating it from the fixed annular part 10 of the front wall 6. The piston 8 continues to move until the shoulder 19 of the piston engages the shoulder 17 of the annular part 10 of the front wall. Complete separation of the two stages 1 and 2 takes place when the combustion of the central charge 11 has ended, because the front stage 1 possesses a smaller maximum cross-section than that of the rear stage 2. Thus, after ignition of the charge 3, the front stage 1 continues its trajectory alone, the ignition being achieved, in a manner which is in itself known, after the rocket has left the launching tube.

The apertures 21, situated behind the casing 9, make it possible for the combustion gases emitted by the charges 11 and 14 to be ejected backwards by means of a single central nozzle 20.

The third charge 23 makes it possible to increase the total mass of the charge contained in the rear stage 2 and, consequently, to increase the initial acceleration of the latter. This third charge 23 also makes it possible, for a given mass of propellant, to reduce the length of the tubes of propellant 11a, 14a and 23a and, consequently, to reduce the risk of the latter breaking.

Figure 4:
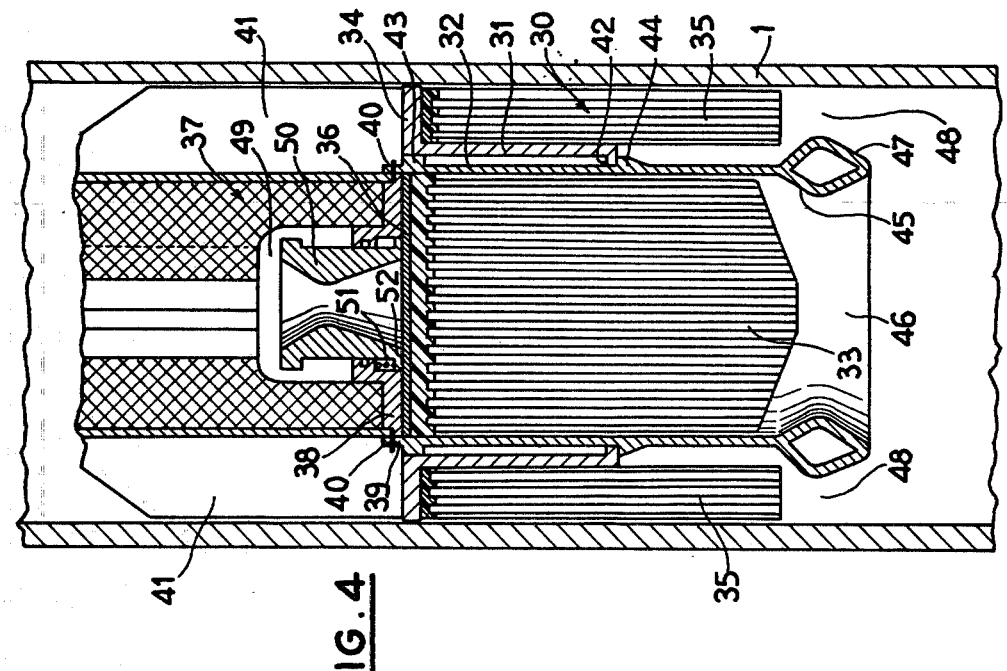
FIG. 4 is a partial longitudinal cross-section through another rocket embodying the invention.

In the embodiment in FIG. 4, a sliding part of the front wall of the rear stage 30 comprises a sleeve 31 mounted so as to slide on a cylindrical partition 32 which surrounds a central charge 33. The sleeve 31 comprises a flange 34 which carries a peripheral charge 35, the combustion time of which is greater than the combustion time of charge 33 by about one millisecond. The flange 34, in the rest position as indicated in FIG. 4, is level with an extension of a fixed central part 36 of the front wall of the rear stage 30.

The front stage 37 is arranged so as to rest against the fixed central part 36 of the rear stage front wall and the rear part 38 of the front stage 37 is encased in a front part 39 of the cylindrical partition 32 which projects beyond the central part 36.

Shear pins 40, inserted in the rear part 38 of the front stage 37 and pass through the front part 39 of the rear stage 30, to provide a frangible connection between the two stages 30 and 37.

The flange 34 of the sleeve 31 rests against small stabilising blades 41 of the front stage 37, and the travel of the sleeve 31 is restricted, on the one hand, by an inner flange 42 situated at the rear end of the sleeve 31, and, on the other hand, by an annular shoulder 43 connected to the front end of the cylindrical partition 32. In the rest position, the inner flange 42 of the sleeve 31 rests on an annular projection 44 situated on the external surface of the cylindrical partition 32.

The rear end of the cylindrical partition 32 carries a nozzle possessing an annular and convex internal surface 45 which defines a central nozzle 46 for the ejection of the combustion gases from the charge 33. The nozzle furthermore possesses an external surface 47, which is also annular and convex and which defines, together with the launching tube 1, a peripheral nozzle 48 for the ejection of the combustion gases from the peripheral charge 35.

The propellant charge of the front stage 37 has a rear recess 49 forming a chamber which houses a nozzle 50. The nozzle can be moved rearwards by the action of a spring 51 inserted between the base 38 of the front stage 37 and an annular flange 52 situated on the nozzle 50.

In the rest position, as indicated in FIG. 4, the whole of this nozzle 50 is housed in the recess 49, its rear part resting against the front wall 36 of the rear stage 30.

FIG. 5 illustrates the manner the rocket described hereinabove functions:

When the charges have been ignited and the combustion of the central charge 33 has ended, the flange 34 of the sleeve 31 is subjected, for about 1 millisecond, to the thrust created by the peripheral charge 35, the effect of which is to shear the pins 40 which connect the two stages 30 and 37. After the pins 40 have been sheared, the sleeve 31 moves forwards in the direction of arrow $F_1$, thus separating the base 38 of the front stage 37 from the front wall 36 of the rear stage 30. During this movement, the nozzle 50 is pushed rearwards by the spring 51. Actual separation of the two stages 30 and 37 takes place when the combustion of the peripheral charge 35 has ended.

FIG. 6 shows a rocket of simplified form.

As in the embodiment of FIG. 1, the rear stage 60 comprises a front wall possessing a central part 61 which can slide in a cylindrical body 62 which is fixed to a peripheral part 63 of the front wall and separates the central charge 64, carried by the sliding part 61, from the peripheral charge 65, carried by the peripheral part 63. The central charge 64 has a combustion time which is slightly longer than that of the peripheral charge 65.

In the rest position, as indicated in FIG. 6, the sliding central part 61 is situated behind the peripheral part 63 and rests on an annular shoulder 66 on the internal surface of the cylindrical body 62. The two charges 64 and 65 discharge into a single central nozzle 67.

The front stage 68 rests, by means of its base 69, against the peripheral part 63 of the front wall of the rear stage 60. The base 69 supports a central nozzle 70, the rear end 71 of which is inserted in a cylindrical recess 72 in the sliding part 61 of the front wall of the rear stage 60. The recess 72 serves to centre the front stage 68 relative to the rear stage 60.

When the second stage charges have been ignited and combustion of the peripheral charge 65 has ended, the central part 61 moves in the direction of arrow $F_3$ under the action of the thrust exerted by the combustion of the central charge 64, and thus separation of the front stage 68 from the rear stage 60 occurs which possess the same maximum cross-section.

In the above described rockets the front stage is separated efficiently and practically instantaneously from the rear stage. In fact, separation occurs during a very short time difference (about one millisecond) which exists between the combustion times of the two charges contained in the rear stage.

Furthermore, the separation does not require any additional propellant charge other than the propellant charges of the two stages, nor does it require any complicated mechanical device. Moreover, the means for achieving separation provided according to the invention do not have any noticeable influence on the total weight and hence the range of the rocket.

Although, the propellant charges 11, 14, 23, 33, 35, 64 and 65, have been described as comprising tubes of propellant, other forms of charge, such as sheet charges or block charges could be used.

Furthermore, the tabs 17 and the shear pins 40 could be replaced by other means providing a temporary connection between the two stages, such as stops which can be retracted by the action of pressure.

Other possible modifications will occur to persons skilled in the art.

What we claim is:

1. A self-propelled engine, such as a rocket intended to be launched from a tube, comprising a front stage and a rear accelerating stage which is provided with a front wall, means for achieving the separation of the two stages at the end of the combustion of the propellant charge contained in the acceleration stage, said propellant charge being integral with said front wall of the rear acceleration stage, wherein the front wall includes a first fixed part and a second part capable of sliding along the axis of the engine, said front wall parts each carrying respective propellant charges separated by a partition fixed in leakproof manner to one of said parts of the front wall, the second part which slides rests against the front stage, and the charge carried by the second part has a slightly longer combustion time than that carried by the first part which is fixed.

2. A self-propelled engine according to claim 1, wherein the second part of the front wall which slides is guided axially by the partition which separates the two propellant charges.

3. A self-propelled engine according to claim 1 wherein the second part of the front wall which slides is firmly connected to the first part by a temporary joint which is arranged to be broken when the combustion of the charge carried by the first part is complete.

4. A self-propelled engine according to claim 1 wherein the first and second parts of the front wall comprises stops for limiting the relative movement between the parts.

5. A self-propelled engine according to claim 2 wherein the second part is a piston mounted in a casing which forms the said partition, the piston having a head carrying the charge, and a skirt which normally rests freely against a rear wall of the front stage.

6. A self-propelled engine according to claim 5, wherein a frangible member connects the skirt of the piston to the first part of the front wall.

7. A self-propelled engine according to claim 1, wherein the rear stage includes a nozzle positioned rearwardly of the charges, the partition is provided intermediate the charges and the nozzle with apertures so arranged that all the combustion gases produced by the two charges are ejected through the nozzle.

8. A self-propelled engine according to claim 7, wherein the said nozzle is positioned centrally.

9. A self-propelled engine according to claim 8, wherein an intermediate wall is located behind the apertures in the partition and around an inlet of the central nozzle, the intermediate wall carrying a third propellant charge which surrounds the nozzle.

10. A self-propelled engine according to claim 2 wherein the second part which slides is a sleeve mounted around a cylindrical body which forms the partition, the sleeve comprising an annular flange which carries the propellant charge being in inactive position and being located in the extension of the central part of the front wall.

11. A self-propelled engine according to claim 10, wherein the flange of the sleeve normally rests freely against small blades of the front stage.

12. A self-propelled engine according to claim 10 wherein a rear part of the front stage is joined to the first fixed part of the rear stage front wall by means of shear pins.

13. A self-propelled engine according to claim 10, wherein a rear part of the front stage has a recess in which a nozzle is housed, the nozzle being arranged to move backwards when the two stages separate.